Dec. 9, 1947.   R. CHILTON   2,432,191
FLUID COUPLING AUTOMATIC CONTROL VALVE
Filed Jan. 19, 1944   2 Sheets-Sheet 1

INVENTOR.
ROLAND CHILTON.
BY
ATTORNEY

Dec. 9, 1947.  R. CHILTON  2,432,191
FLUID COUPLING AUTOMATIC CONTROL VALVE
Filed Jan. 19, 1944  2 Sheets-Sheet 2

INVENTOR.
ROLAND CHILTON.
BY
ATTORNEY

Patented Dec. 9, 1947

2,432,191

UNITED STATES PATENT OFFICE 2,432,191

FLUID COUPLING AUTOMATIC CONTROL VALVE

Roland Chilton, Ridgewood, N. J., assignor to Wright Aeronautical Corporation, a corporation of New York Application January 19, 1944, Serial No. 519,083

8 Claims. (Cl. 60—54)

This invention relates to fluid couplings or clutches and is particularly directed to means for controlling the loading and unloading of such a coupling or clutch. The fluid coupling illustrated has been designed for use with the transmission disclosed in applicant's copending applications, Serial No. 462,059, filed October 14, 1942, now Patent No. 2,400,536, and Serial No. 492,166, filed June 23, 1943, now Patent No. 2,400,539, but it should be understood that the invention is of general application.

The aforementioned copending applications disclose a fluid coupling provided with a continuous fluid bleed port at its periphery. This bleed port permits the coupling to be unloaded whenever the supply of fluid thereto is cut off, and it necessarily is considerably smaller than the fluid inlet passage in order that filling of the coupling may take place fairly rapidly. It has been found that after the fluid enters the coupling, there is an appreciable time interval before the fluid begins to transmit torque. Because of this delay in the torque transmission of the fluid upon entering the coupling, and because of the small size of the vent port, the loading of the coupling actually may increase momentarily after the supply of fluid thereto is cut off instead of immediately beginning to unload. Accordingly, it is an object of this invention to so control the filling and emptying of the fluid coupling that the torque transmitted by the coupling immediately and quickly falls off as the fluid supply thereto is cut off. It is a further object of this invention to provide a fluid coupling with valve means which automatically opens a fluid bleed port therefor whenever the fluid flow thereto is cut off, and which automatically closes the bleed port upon application of fluid flow to the coupling. With this arrangement the escape or bleed port of the fluid coupling no longer needs to be appreciably smaller than the fluid inlet passage, but can be made as large as desired, whereby the coupling may be quickly unloaded.

Because of the centrifugal force acting on the rotating fluid of the coupling, the fluid bleed port and the cooperating valve member are located at the outer periphery of the coupling housing. The linear peripheral speed of the coupling housing may be quite large; e. g., in the structure illustrated in applicant's aforementioned copending applications, the coupling rotates at a speed in the neighborhood of 20,000 R. P. M. Accordingly, it is a further object of this invention to provide an annular valve member for controlling the coupling bleed or escape ports, which valve member is centrifugally balanced and is free to rotate with the coupling in order to minimize any friction between the valve member and its seat.

It is a further object of this invention to provide an annular valve member which may be used with either a fluid coupling or with a rotating piston-cylinder friction clutch assembly in which it is desirable to control a fluid vent at the periphery of the rotating cylinder.

Other objects of this invention will become apparent upon reading the annexed detailed description in connection with the drawing, in which.

Figure 1:
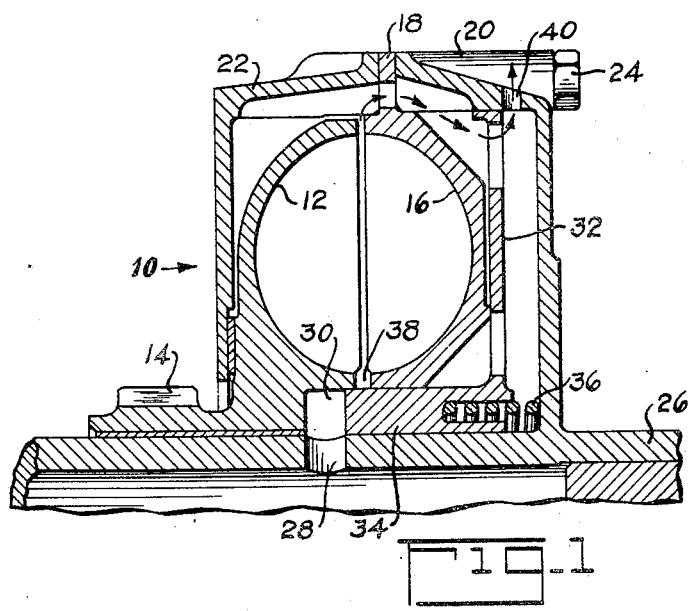
Fig. 1 is an axial view of a fluid coupling embodying applicant's invention and in which a coupling bleed valve is open.
Figure 2:
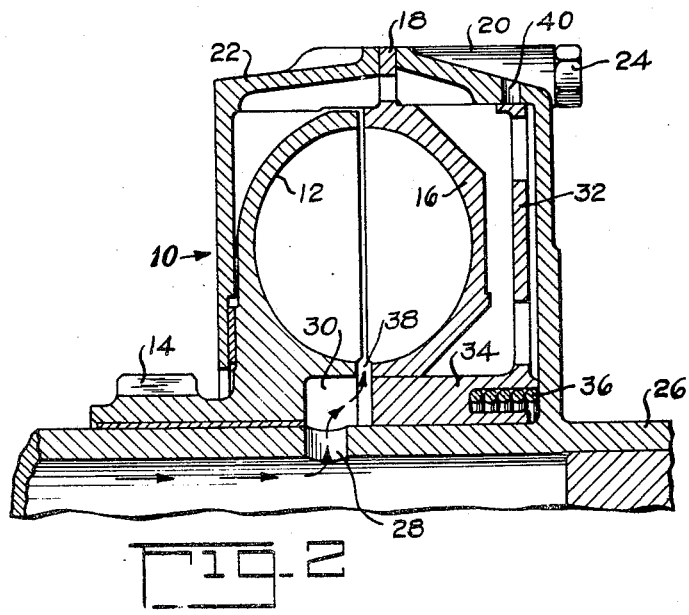
Fig. 2 is a view similar to Fig. 1 in which the coupling bleed valve is closed.

Referring to Figs. 1 and 2, a fluid coupling 10 comprises a driving coupling member 12 having a driving gear 14 formed integral therewith and a driven coupling member 16. The driven coupling member 16 is provided with a peripheral radial extending flange 18 to which an annular housing or cover, comprising parts 20 and 22, is secured by bolts 24. A hollow driven shaft 26 is formed integral with the one part 20 of the coupling housing.

Fluid pressure is supplied to the hollow shaft 26 under the control of valve means (not shown) and thence through radial passages 28 to an annulus 30 between the shaft 26 and the coupling. An annular valve member 32 is disposed within the coupling housing 20, 22 and is provided with an annular hub 34 slidably received within the annulus 30. Upon application of fluid to the hollow shaft 26, the fluid pressure acts against the valve hub portion 34 to move the valve member to the right, as viewed in the drawing, against a spring 36. This movement of the valve member to the right uncovers an annular inlet port 38 between the coupling members 12 and 16, whereupon the coupling proceeds to fill as indicated by the arrows in Fig. 2.

The coupling housing 20, 22 is provided with one or more circumferentially spaced bleed ports 40, which are adapted to be closed by the outer periphery of the valve member 32 upon rightward movement thereof. That is, when fluid is supplied for filling the coupling, the valve member is moved to the right to uncover the inlet port 38 and to simultaneously close the bleed ports 40. When it is desired to empty or unload the coupling, the fluid pressure supplied thereto is cut off, whereupon the spring 36 moves the valve member to the left to close the inlet port 38 and to open the bleed ports 40, through which the coupling fluid is discharged by the centrifugal force acting thereon, as indicated in Fig. 1.

With this construction the bleed ports 40 may be as large as desired so that the coupling rapidly unloads when the bleed ports are opened. Also, before the coupling can be loaded, it is necessary that the fluid pressure move the valve member 32 to the right to cover the bleed ports 40, since this same movement opens the inlet port 38. That is, it is impossible for fluid to be admitted to the coupling while the bleed ports 40 are open. Another desirable feature of the above construction is that the valve member is disposed within the coupling housing and is free to rotate with the coupling.

Figure 3:
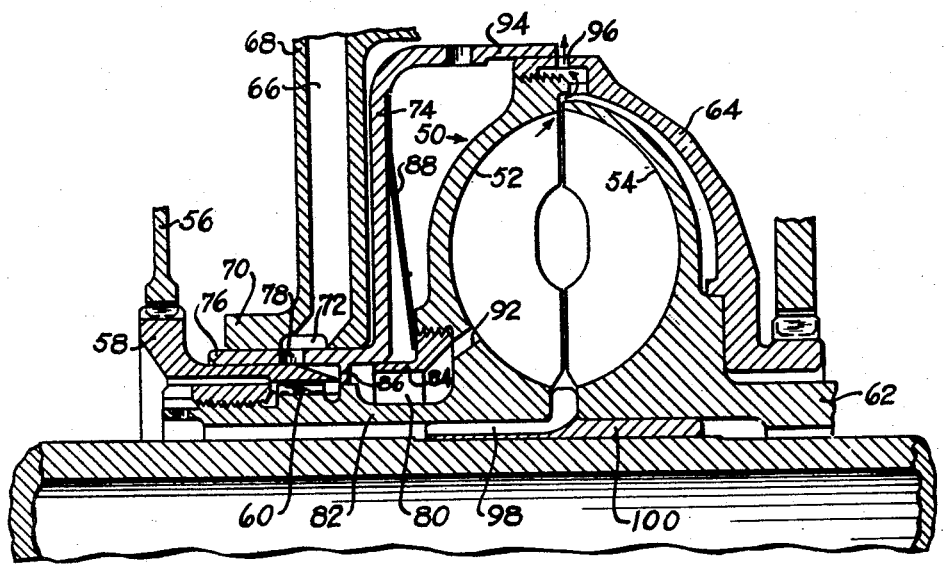
Figs. 3 and 4 are views similar to 1 and 2, respectively, of a modification.
Figure 4:
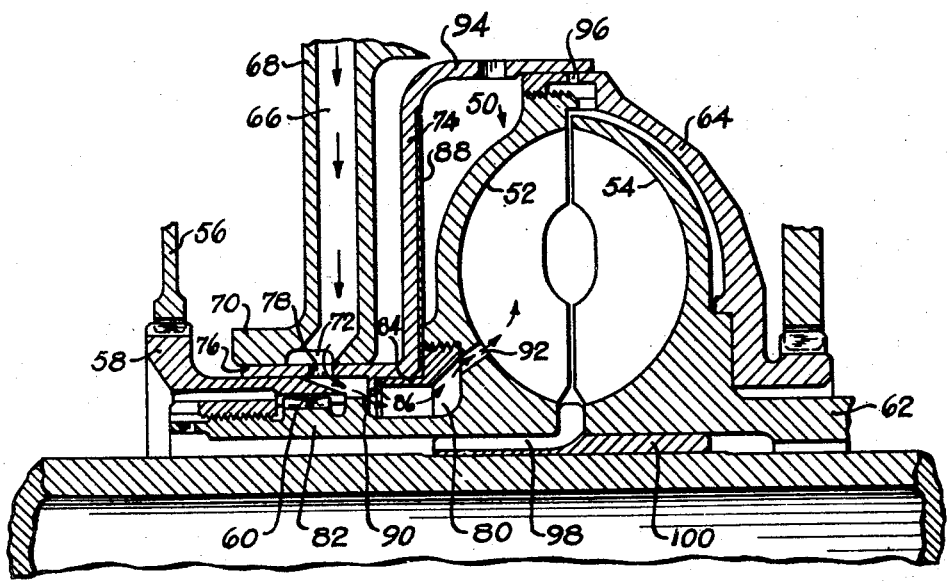

Figs. 3 and 4 illustrate a modification in which the valve member is disposed exteriorly of a fluid coupling 50 comprising a driving coupling member 52 and a driven coupling member 54. A gear 56 is drivably connected to the gear 58 which in turn is splined to the coupling member 52 at 60, while the driven coupling member 54 is formed integral with a driven shaft 62. An annular cover member 64 is rigidly secured to the periphery of the driving coupling member 52 and embraces the driven coupling member 54.

The fluid pressure is controllably supplied to a passage 66 in a fixed structure 68 having a hub 70 with an annulus 72 in communication with the passage 66. An annular axially movable valve member 74 is provided with an inner axially extending hub portion 76 slidably received between the fixed hub 70 and a cylindrical surface on the gear 58. The valve hub portion 76 is provided with a plurality of openings 78 through which fluid may flow from the hub annulus 72 to an annulus 80 formed about the hub extension 82 of the driving coupling member 52 by a flange 84 connected thereto, and the valve hub 76.

The valve hub 76 is provided with an inwardly extending annular flange 86 disposed across the annular chamber 80. With this arrangement, when fluid is supplied to the passage 66, the fluid pressure against the flange 86 will move the valve member 74 to the right against a spring 88 to open an annular inlet port 90, thereby admitting fluid into the coupling from the annulus 80 through the inlet openings 92, as illustrated in Fig. 4.

The valve member 74 is also provided with an axially extending flange 94 at its outer periphery, which is adapted to cover one or more circumferentially spaced bleed ports 96 in the cover member 64 upon the aforementioned movement of the valve member to the right. When the supply of fluid pressure to the coupling is cut off, the valve member is moved to the left by the spring 88 to close the inlet passage to the coupling, and to simultaneously open the coupling bleed ports 96, whereupon the coupling quickly empties through these ports, as illustrated in Fig. 3. It should be noted that in both modifications, Figs. 1 and 3, the hub of the valve member has a relatively loose fit in the fluid inlet passage, whereby when the fluid supply to the coupling is cut off, the fluid in the inlet passage readily leaks around the valve member as it is displaced upon movement of the valve by the spring 36 or 88. A vent passage 98 is provided in a bushing 100 at the hub of the coupling to permit air to leave the coupling as it fills. A similar passage (not shown) is also provided in the structure of Figs. 1 and 2.

In both of the afore described modifications the differential fluid pressure necessary to maintain the valve member in its right hand position against the spring results from the flow of fluid into the coupling. Therefore, if the application of fluid pressure to the coupling should be continued after the coupling has filled completely, the flow of fluid into the coupling and the fluid pressure differential acting on the valve member will decrease, whereupon the valve spring will move the valve member toward the left to open the coupling fluid bleed ports. The valve member will move to the left to a position in which the bleed ports have opened sufficiently to provide a fluid flow through the coupling of such magnitude that the resulting differential fluid pressure acting on the valve member just balances the valve spring. Here again it should be noted that the valve member does not close the inlet port tightly, and the leakage therethrough and out through the slightly opened bleed ports provides the necessary fluid pressure differential to balance the valve spring when the coupling has filled completely. In other words, if the coupling be run completely full of fluid, the valve member will assume a position in which there is a continual small flow of fluid through the coupling of such magnitude that the resulting fluid pressure differential acting against the valve member balances the force of the valve spring. This small flow of fluid through the coupling may be desirable in order to help cool the coupling.

In either of the above described modifications a relatively simple one-piece valve is automatically operative to close a bleed port of a fluid coupling upon the supply of fluid thereto. With this arrangement, the coupling may be quickly filled and the bleed ports may be made quite large so that the coupling can also be quickly emptied or unloaded.

A rotating piston actuated friction type clutch or coupling loadable by admitting fluid under pressure to a cylindrical space behind the piston may generally be used in lieu of a fluid coupling in which the torque is transmitted through the fluid itself. For example, applicant's aforementioned Patent No. 2,400,539 illustrates a transmission employing either a conventional multidisc type friction clutch loadable by fluid pressure or a fluid coupling. In such a rotating friction clutch, because of the centrifugal force acting on the fluid within the clutch cylinder, it is necessary to provide vent or bleed ports at the periphery of the clutch cylinder in order to drain the cylinder and permit the clutch to disengage when the fluid pressure thereto is cut off. Therefore, either of the aforedescribed valves 32 and 74 is also readily applicable to a conventional rotating piston-cylinder friction clutch assembly for controlling the inlet fluid passage to the clutch cylinder and its peripheral bleed port or ports. Accordingly, the terms clutch or coupling as used in the claims are intended to be broad enough to include the conventional fluid coupling in which torque is transmitted through the fluid itself and the equally conventional rotating friction clutch or coupling loadable by admitting fluid pressure behind a piston.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. A fluid clutch comprising driving and driven members, a fluid inlet and a fluid outlet passage, an annular housing rotatable with one of said clutch members and disposed thereabout, and an annular valve member disposed between said housing and said one clutch member, said valve member being rotatively free except for frictional drag thereon and being axially movable to control said passages.

2. A fluid clutch comprising driving and driven members, a fluid inlet and a fluid outlet passage, an annular housing rotatable with one of said clutch members and disposed thereabout, and a valve member disposed between said housing and said one clutch member, said valve member being axially movable in response to the supply of fluid to said inlet passage for closing said outlet passage.

3. A fluid clutch comprising driving and driven members, a fluid inlet and a fluid outlet passage, an annular housing rotatable with one of said clutch members and disposed thereabout, a valve member disposed between said housing and said one clutch member, said valve member being axially movable in response to the supply of fluid to said inlet passage for closing said outlet passage, and spring means for opposing said valve member movement.

4. A fluid clutch comprising driving and driven members, a fluid inlet and a fluid outlet passage, an annular housing rotatable with one of said clutch members and disposed thereabout, and an annular valve member disposed between said housing and said one clutch member, said valve member having a portion extending into communication with said inlet passage and being responsive to the supply of fluid thereto for closing said outlet passage.

5. A fluid clutch comprising driving and driven members, a fluid inlet and a fluid outlet passage, an annular housing rotatable with one of said clutch members and disposed thereabout, and an annular valve member disposed between said housing and said one clutch member and being rotatively free except for frictional drag thereon, said valve member being axially movable in response to the supply of fluid to said inlet passage for closing said outlet passage.

6. A fluid clutch comprising driving and driven members, a fluid inlet and a fluid outlet passage, an annular valve member having first and second annular portions rigidly connected together for unitary movement and respectively cooperating with said inlet and outlet passages, and a spring for axially urging said valve member in a direction for opening said outlet passage, said valve member being rotatively free except for frictional drag thereon and being automatically axially movable against said spring in response to the supply of fluid to said inlet passage for at least substantially closing said outlet passage.

7. A fluid clutch comprising driving and driven members, a fluid inlet passage and a fluid outlet passage, a valve member having first and second annular portions rigidly connected together for unitary movement, and respectively controlling said inlet and outlet passages, and means for axially urging said valve member in a direction for opening said outlet passage, said valve member being rotatively free except for frictional drag thereon and being automatically axially movable against said means in response to the supply of fluid to said inlet passage for at least substantially closing said outlet passage.

8. A fluid clutch comprising driving and driven members having a fluid chamber, a fluid inlet passage and a fluid outlet passage for said chamber, a valve member, and spring means for urging said valve member in one direction for closing said inlet passage and opening said outlet passage, said valve member having a portion subjected to the fluid supplied to said inlet passage for moving said valve member against said spring to completely close said outlet passage while said chamber contains less than a predetermined amount of fluid and when said chamber has more than said amount of fluid said spring is effective to move said valve member to at least partially open said outlet passage to permit a continuous flow of fluid through said clutch chamber.

ROLAND CHILTON.

REFERENCES CITED

The following references are of record in the file of this patent:

UNITED STATES PATENTS

| Number | Name | Date |
|---|---|---|
| 1,866,424 | Schmieske | July 5, 1932 |
| 2,024,842 | Bauer | Dec. 17, 1935 |
| 2,161,398 | Yingling | June 6, 1939 |

FOREIGN PATENTS

| Number | Country | Date |
|---|---|---|
| 518,828 | Germany | 1931 |